Patented Feb. 15, 1949

2,461,735

UNITED STATES PATENT OFFICE 2,461,735

PROCESS OF TREATING INTERPOLYMERS OF STYRENE, ALLYLIC FUMARATE, AND ALLYLIC ALCOHOL

Charles A. Heiberger, Nitro, W. Va., assignor to United States Rubber Company, New York, N. Y., a corporation of New Jersey No Drawing. Application December 10, 1946, Serial No. 715,345

7 Claims. (Cl. 260—78.5)

This invention relates to improvements in soluble interpolymers of styrene, allylic fumarate, and allylic alcohol.

In Tawney application Serial No. 580,487, filed March 1, 1945, and now abandoned, reference is made to interpolymerizing a mixture of styrene, a monomeric allylic fumarate, and a monomeric allylic alcohol to form therefrom a soluble fusible interpolymerizate. The products are generally colorless solids. Elementary analysis and other specific tests indicate that the products are ternary interpolymers. Typical products may contain, for example, about 50% by weight of diallyl fumarate, about 25% by weight of styrene, and about 25% by weight of allyl alcohol. They contain, attached to the polymer chain, hydroxymethyl groups derived from the interpolymerized allylic alcohol molecules, which renders the copolymers capable of modification by agents reactive with primary alcohols. e. g., alkyl halides, organic acids, etc. The products contain residual unsaturation, and application of heat, particularly in the presence of catalysts, induces further polymerization to the insoluble, infusible stage. The unsaturated products are soluble in many organic solvents, e. g., acetone, xylene, etc. It has now been found that the resulting soluble ternary interpolymers, under storage conditions and use, produce undesirable lachrymatory effects induced by liberation of allylic alcohol. The mechanism by which these interpolymers liberate allylic alcohol is not definitely known, but it is believed that it takes place through formation of lactone rings in the polymer molecules.

It is an object of this invention to so treat the preformed soluble interpolymers so as to reduce to a minimum the tendency of the interpolymers to produce such undesirable effects. A further object resides in thermally modifying the said preformed interpolymers whereby, through lactonization or other pyrolytic reaction, the thermally modified interpolymers show, after storage, little or no tendency to produce lachrymatory effects. Other objects will be apparent from the following description.

According to the invention, the preformed soluble styrene-allylic fumarate-allylic alcohol interpolymer which shows undesirable lachrymatory effects on storage, mixing, etc., is heated at a sufficienty high temperature to dissociate from the interpolymer, by lactonization or other pyrolytic reaction, an allylic alcohol, and concurrently with the heating, the liberated allylic alcohol is removed either continuously or intermittently from the heating (reaction) zone containing the resin. The operation is continued until the residue, i. e., the thermally modified interpolymer, contains, upon standing for 7 days at 70° C., not more than 0.4% by weight of free allylic alcohol based on the solid resin. The removal of the liberated allylic alcohol from the interpolymer reaction zone during the heating is required in order to bring the lactonization, or other reaction. to substantial completion.

As the examples of my invention given below will show, the allylic alcohol which causes the objectionable lachrymatory effects under ordinary conditions of commercial use is not mere unreacted allylic alcohol remaining in the interpolymers after preparation. Through ordinary methods the interpolymers can be carefully purified by reprecipitation from organic solvents, or by adding an entrainer and distilling to remove volatile impurities, yet the resulting purified interpolymers will be free from lachrymatory properties for only a very short period of time. After a few days of storage even the carefully purified interpolymers will develop lachrymatory properties that render them objectionable for commercial use.

My invention, therefore, is directed towards a thermal method of modifying the interpolymers to liberate and remove combined allylic alcohol which otherwise would be liberated slowly during storage. This method requires a substantially longer time and/or higher temperature than is employed in ordinary removal of unreacted allylic alcohol from the crude interpolymers because the lactonization or other pyrolytic decomposition by which combined allylic alcohol is liberated takes place relatively slowly. Thus, the small amount of such reaction which may take place incidental to ordinary removal, by low-temperature distillation, of unreacted reactants, does not serve to make the resultant interpolymers usable commercially because further lactonization takes place during storage and the interpolymers thereby become lachrymatory. My invention contemplates bringing the reaction liberating allylic alcohol to substantial completion by materially prolonging the time for which the interpolymer is maintained at an elevated temperature, or by using substantially higher temperatures than are required for ordinary purification by distillation.

By an "allylic" herein is meant the allyl and substituted allyl radicals of the group

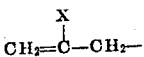

where X is H, methyl, or chlorine. Further, the invention applies not only to the use of styrene for the purpose, but to nuclearly alkyl-substituted styrenes, e. g., p-methyl styrene, p-ethyl styrene, and to nuclearly chloro-substituted styrenes, e. g., p-chlorostyrene.

The improved soluble interpolymers are, like those of Tawney in application Serial No. 580,487, suited to the formation of tough rigid castings and are also adapted for the preparation of cheap coating compositions, and have generally the same useful chemical and physical properties as the untreated (unheated) soluble interpolymers. They too may be converted to insoluble and infusible products or interpolymerized with other unsaturated organic materials capable of addition polymerization, particularly compounds containing an ethylenic linkage, such as methyl acrylate, allyl acrylate, allyl fumarate, vinyl acetate, etc., as described by Tawney. Similarly, they can be dissolved in appropriate solvents and used as lacquers or as impregnating and waterproofing compositions.

In a preferred form of the invention, the heating of the preformed ternary acetone-soluble interpolymer is carried out in the presence of an added amount of a suitable liquid to serve both as a solvent for the resinous copolymer and as an entrainer for the allylic alcohol, sufficient in amount to make a resin solution containing from about 25 to about 30% solids by weight. It is also preferable to add a suitable polymerization inhibitor, such as guaiacol, hydroquinone, etc., to prevent formation of gel. The resin solution is then heated, for example, at from about 90° C. to about 100° C., for from about 2 to about 6 hours, with continuous or intermittent removal, by distillation, of the allylic alcohol formed by lactonization or other reactions. Additional entrainer is added to the resin solution, continuously or intermittently, in order to replace that distilled off during the treatment.

Various entrainers for the allylic alcohol may be selected. Xylene is convenient, since it forms an azeotropic mixture with the allylic alcohol, and because it serves as a suitable solvent for the commercial uses of the polymer solution. However, other entrainers may be used, such as solvent naphtha, diacetone alcohol, carbon tetrachloride, cyclohexane, benzene, toluene, etc., the entrainer being inert towards the resin and having a boiling point to accommodate the temperature range of the heat treatment, the pressures being adjusted accordingly. If the entrainer does not form an azeotrope with the allylic alcohol, its boiling point should preferably be higher than the allylic alcohol for efficient removal of the latter, as will be apparent to those skilled in the art.

After completion of the heat treatment and entrainment of the allylic alcohol, the solids concentration may be adjusted, as desired, according to the requirements of the contemplated use. It will generally be found that in spite of the inhibitor present, the heat treatment has resulted in an appreciable increase in the viscosity, which renders the solutions especially suitable, for instance, for use in paint spraying equipment.

The temperature of the heat treatment may vary, being preferably from about 90° C. to about 100° C. At temperatures much below 90° C., e. g., 70° C., the reaction proceeds undesirably slowly, requiring an impractically long time to liberate and remove the allylic alcohol. Above 100° C., reaction is more rapid and the tendency to form gel is increased. A generally useful range, however, is from 70° C. to 125° C., the time required being generally from 1 to 24 hours.

Further, a fractionating column may be employed to advantage during the heat treatment and distillation. This enables the allylic alcohol to be removed with a relatively small proportion of entrainer, since the larger portion of the entrainer which is evaporated from the resin solution is returned as reflux. In addition, the bulk of the allylic alcohol tends to become concentrated near the top of the fractionating column, keeping the concentration of allylic alcohol in the still pot at a minimum and allowing the lactonization or other reactions to proceed to substantial completion more quickly.

The following examples illustrate the invention in more detail, the parts being by weight.

EXAMPLE 1

A xylene solution containing 30% by weight of the allyl alcohol-free soluble interpolymer of styrene, diallyl fumarate and allyl alcohol is used in this example. The solution contained 0.5 of guaiacol on the weight of the solids to inhibit gel formation during the heat treatment.

One thousand parts of the resin solution are subjected to four successive heating periods, separated by distillation periods in each of which the distillation of the xylene containing the liberated allyl alcohol is continued until the distillate is substantially free of allyl alcohol. Additional xylene is added after each vacuum distillation so as to restore the concentration of resin in the solution to about 30%.

Data for these four heating periods and distillations are given in the table.

TABLE

Intermittent heat-treatment of interpolymer solutions

| Heating period | 1 | 2 | 3 | 4 |
|---|---|---|---|---|
| Time of heat treatment, hours | 2 | 1 | 1½ | 1 |
| Pot temperature (°C.) | 90–95 | 90–95 | 90–95 | 90–95 |
| Parts xylene-allyl alcohol removed by vacuum distillation | 316 | 296 | 382 | 470 |
| Parts allyl alcohol liberated | .17 | .22 | .12 | .18 |
| Percent allyl alcohol liberated on weight of interpolymer | 0.06 | 0.07 | 0.04 | 0.06 |

The total allyl alcohol liberated during the four heating periods is thus 0.23% on the weight of solid polymer.

After the last distillation, the cooled product is diluted to 50% solids with xylene. One sample of this solution was stored 16 days at 70° C., and a second sample was stored 75 days at room temperature. These samples did not liberate sufficient allyl alcohol during the storage periods to give any objectionable lachrymatory effect on a paint mill.

In contrast to this example, a sample of the untreated interpolymer from which all the unreacted allyl alcohol, originally added as such to the resinification reaction mixture, had been removed by distillation with xylene was at first satisfactory when used on the mill, but after storage for 7 days at 70° C. sufficient allyl alcohol had been liberated to render the product unsatisfactory from the standpoint of lachrymation caused by liberated allyl alcohol.

EXAMPLE 2

In this example the heat treatment was carried out continuously by heating 100 parts of a 30% solution of allyl alcohol-free soluble interpolymer of styrene, diallyl fumarate and allyl alcohol in xylene at 95–100° C., at a pressure of about 150 mm. of mercury for a period of about 4.7 hours, distillation proceeding at such rate that about 56 parts of xylene-allyl alcohol mixture distilled off during this time. The xylene thus removed was replaced from time to time in the still pot with fresh xylene. The resin solution was then concentrated to 58.6% solids by distillation. The total weight of allyl alcohol liberated, as determined by bromine titration, was equal roughly to about 0.4% of the weight of the resin.

The resin solution was adjusted to 50% solids by the addition of xylene, and 0.5% of guaiacol inhibitor was added.

After storage for 7 days at 70° C., this heat-modified product was sufficiently free of liberated allyl alcohol to permit use on a paint mill without objectionable lachrymatory effect.

EXAMPLE 3

This illustrates the preparation of the interpolymer without heat treatment but with purification in the presence of xylene, according to prior practice, merely to show that the purified untreated product does not have the same advantage in commercial use after a short period of storage as the product treated in the manner of this invention.

The crude interpolymer solution, of the same monomers as in Example 1, was distilled under vacuum to remove the excess reactants, including allyl alcohol. In the course of the distillation the vapor temperature dropped from 55° C. at 133 mm. of mercury pressure, to 35° C. at 10 mm. of mercury pressure. In this step 1,451 parts of distillate were removed during a period of 2 hours. The residue was cooled and diluted with 1932 parts of xylene and a second vacuum distillation was carried out to remove the residual allyl alcohol. In the course of this distillation 1632 parts of xylene-allyl alcohol were removed during 4 hours, at a vapor temperature ranging from 54° C. at 107 mm. pressure initially to 42° C. at 30 mm. pressure at the end.

The residue was cooled and an additional 400 parts of xylene were added and 428 parts distilled off during 1 hour in the same manner as previously. The last portion of this distillate still gave a strongly positive test for allyl alcohol.

Another 400 parts of xylene were added to the cooled residue and distillation was resumed for ¾ hour until 454 parts had been distilled off, when a portion of the distillate gave a negative test for allyl alcohol showing that all the free allyl alcohol in the resin solution had been removed.

A 50% solution of this polymer in xylene contained no lachrymator when tested shortly after the above purification, but after storage for 7 days at 70° C., the polymer solution was found to be strongly lachrymatory, due to the presence of allyl alcohol liberated during storage.

EXAMPLE 4

A fractionating column is employed in this example. The purification of the crude soluble interpolymer solution, of the same monomers as in Example 1, and the heat treatment are carried out in an essentially one-step operation.

The 1200 parts of unpurified interpolymer solution (about 25% solid resin) used in this example contained 210 parts of xylene which had been added to the original reaction mixture used in making the soluble interpolymer. The solution was distilled under diminished pressure from a 2-liter flask fitted with a fractionating column 48 cm. long and 2.5 cm. in diameter, packed with 6 x 6 mm. Raschig rings. About 860 parts of xylene and allyl alcohol mixture were distilled over without reflux in 1¼ hours. At this point the vapor temperature had risen to 65° C., at a pressure of 275 mm. of mercury, and the distillate then coming over contained less than 0.5% of allyl alcohol, indicating that removal of unreacted allyl alcohol in the interpolymer solution was essentially complete. Distillation was then continued at a high reflux ratio and at a higher temperature for another 2 hours, during which time about 209 parts of xylene, containing allyl alcohol liberated by lactonization or other reactions, were removed at a vapor temperature of 73–75° C. at 100 mm. of mercury pressure. Additional xylene was added to the resin solution intermittently throughout the distillation so as to maintain the concentration of resin at about 25%.

After completion of heat treatment the resin solution was concentrated to 50% solids and 0.5% guaiacol was added to inhibit premature polymerization. After storage for 7 days at 70° C., the solution was sufficiently free of liberated allyl alcohol to permit use on a paint mill without objectionable lachrymatory effect.

A convenient manner of testing the residual thermally-modified interpolymer to determine the amount of "free" allylic alcohol, and thereby the ability or lack of ability to cause lachrymatory effects, is as follows: By "free" allylic alcohol is meant the allylic alcohol measured by the test.

A 50 ml. sample of the heat-treated resin (50% solution in, for example, xylene solvent, with about 0.5% guaiacol added as a stabilizer) is transferred to a 250 ml. three-necked flask. The graduate is rinsed into the flask with 50 ml. of xylene. The flask is then attached through one neck to a vacuum distillation apparatus equipped with a manometer and monostat, and a Hy-vac pump. The other necks are fitted with a thermometer and a capillary inlet for nitrogen. The receivers for the distillate consist of two Dry Ice traps in series. Vacuum is applied until the solution boils gently and the manostat is adjusted to regulate the pressure at this point (about 10 mm. Hg). A slow stream of nitrogen through the capillary inlet acts to keep the boiling smooth. By means of a Glas-Col heating mantle, the temperature of the solution is maintained at 20–30° C. Distillation is continued until about 50 ml. of distillate have been collected.

When the distillation is complete the traps are warmed to room temperature, the contents combined and transferred to a separatory funnel in which they are extracted with two 20 ml. portions of water. The aqueous extracts, containing the allyl alcohol, are transferred to an Erlenmeyer flask to which is added sufficient concentrated sulfuric acid to make the solution 3 N in acid, and 1 drop of 0.1% methyl red solution. The solution is then titrated slowly with 0.02 N bromide-bromate solution to the disappearance of the red color. Extraction and titration of known solutions of allyl alcohol in xylene by the same procedure show constant recoveries of 92% of the allyl alcohol. With this correction factor being taken into account, the titre of an unknown solution of allyl alcohol is taken as a measure of the amount of allyl alcohol present.

While I have shown and described various embodiments of the invention, it is to be understood that the invention is susceptible to those modifications which appear within the spirit of the invention and the scope of the appended claims.

Having thus described my invention, what I claim and desire to protect by Letters Patent is:

1. A process of improving preformed acetone-soluble interpolymers of a styrene, an allylic fumarate, and an allylic alcohol which normally exhibit lachrymatory effects after storage, which comprises heating a mixture of the interpolymer and an inert liquid solvent of the same at a temperature in the range of from 70 to 125° C. for from 1 to 24 hours so that the allylic alcohol is effectively liberated from the interpolymer, and concurrently removing from the zone of heat treatment liberated allylic alcohol, the operations being continued until the residual thermally-modified soluble interpolymer shows on standing for 7 days at 70° C. the presence of not more than 0.4% weight of "free" allylic alcohol.

2. A process as set forth in claim 1 in which the heating is conducted concurrently with distillation of the solvent and of liberated allylic alcohol, and said alcohol thus removed is separated from the mixed distillate, and the inert solvent is returned as reflux to the interpolymer solution being treated.

3. A process as set forth in claim 1 in which a gelatin inhibitor is added to the soluble interpolymer being heat-treated.

4. A process of improving preformed acetone-soluble interpolymers of a styrene, an allylic fumarate, and an allylic alcohol which normally exhibit lachrymatory effects after storage, which comprises heating a mixture of the interpolymer and an inert liquid solvent of the same at a temperature in the range of from 90 to 100° C. for from 1 to 24 hours so that the allylic alcohol is effectively liberated from the interpolymer, and concurrently removing from the zone of heat treatment liberated allylic alcohol, the operations being continued until the liberation and removal of the allylic alcohol are substantially complete.

5. A process of improving preformed acetone-soluble interpolymers of a styrene, an allylic fumarate, and an allylic alcohol which normally exhibit lachrymatory effects after storage, which comprises heating a mixture of the interpolymer and an inert liquid solvent of the same at a temperature in the range of from 90 to 100° C. for from 1 to 24 hours so that the allylic alcohol is effectively liberated from the interpolymer, and concurrently removing from the zone of heat treatment liberated allylic alcohol, the operations being continued until the interpolymer is rendered substantially non-lachrymatory when tested after storage for seven days at 70° C.

6. A process of improving preformed acetone-soluble interpolymers of a styrene, an allylic fumarate, and an allylic alcohol which normally exhibit lachrymatory effects after storage, which comprises heating a mixture of the interpolymer and an inert liquid solvent of the same at a temperature in the range of from 90 to 100° C. for from 1 to 24 hours so that the allylic alcohol is effectively liberated from the interpolymer, and concurrently removing from the zone of heat treatment liberated allylic alcohol, the operations being continued for a sufficient time to render the interpolymer substantially non-lachrymatory.

7. A process of improving preformed acetone-soluble interpolymers of styrene, a diallyl fumarate, and allyl alcohol which normally exhibit lachrymatory effects after storage, which comprises heating a mixture of the interpolymer and an inert liquid solvent of the same at a temperature in the range of from 90 to 100° C. for from 1 to 24 hours so that the allyl alcohol is effectively liberated from the interpolymer, and concurrently removing from the zone of heat treatment liberated allyl alcohol, the operations being continued for a sufficient time to render the interpolymer substantially non-lachrymatory.

CHARLES A. HEIBERGER.

No references cited.